US006976506B2

(12) United States Patent
Towne et al.

(10) Patent No.: US 6,976,506 B2
(45) Date of Patent: Dec. 20, 2005

(54) ANNULAR PORT CONSTRUCTION FOR VALVE APPLICATIONS

(75) Inventors: Lloyd I. Towne, Bryan, OH (US); Thomas R. Headley, Bryan, OH (US)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 10/804,432

(22) Filed: Mar. 19, 2004

(65) Prior Publication Data
US 2005/0205145 A1 Sep. 22, 2005

(51) Int. Cl.[7] ............................................. F15B 13/04
(52) U.S. Cl. ........................... 137/625.69; 137/625.48; 251/900
(58) Field of Search ..................... 137/625.48, 625.69; 251/900

(56) References Cited

U.S. PATENT DOCUMENTS

| | | | |
|---|---|---|---|
| 1,395,469 A | 11/1921 | Benbow | |
| 2,675,024 A | 4/1954 | Clark | |
| 2,920,650 A | 1/1960 | Moog, Jr. | |
| 3,354,912 A | * | 11/1967 | Gordon et al. ......... 137/625.69 |
| 3,565,115 A | 2/1971 | Beckett et al. | |
| 3,635,249 A | 1/1972 | Kirkman | |
| 3,819,152 A | 6/1974 | Clippard, III | |
| 4,491,155 A | 1/1985 | Meyer et al. | |
| 4,777,980 A | 10/1988 | Warhurst et al. | |
| 5,327,936 A | 7/1994 | Takayanagi | |
| 5,595,218 A | 1/1997 | Hallbach et al. | |

OTHER PUBLICATIONS

The Difference Between a "Gland" and a "Groove", Internet Article from Rubber and Thermoplastic Products, Internet Design Guide: Sealing Factors Part 1, Minnesota Rubber and QMR Plastics, Copyright © 2002 Quadion Corporation (2 pp.).

* cited by examiner

*Primary Examiner*—Gerald A. Michalsky
(74) *Attorney, Agent, or Firm*—Michael Best & Friedrich LLP

(57) ABSTRACT

A body element for a spool valve is provided that includes a body having an inner surface that defines an internal valving chamber having a longitudinal axis, and at least one transverse surface to the longitudinal axis. The transverse surface has at least one port comprising an annular flow passage, an intermediate flow passage and an outer flow passage extending outward from and in fluid communication with the inner surface of the internal valving chamber.

10 Claims, 3 Drawing Sheets

ANNULAR PORT CONSTRUCTION FOR VALVE APPLICATIONS

BACKGROUND OF THE INVENTION

This invention relates to valves, and in particular to structure forming the internal porting in spool valves. In a spool valve, the valving action takes place between a movable element, sometimes called a spool, plunger or slider, and a fixed port in the side wall of the spool chamber in the valve body. In the particular type of spool valves to which this invention relates, the porting is in the form of an annular gap or groove that extends circumferentially around the entire side wall of the chamber in which the spool slides. An O-ring or other flexible sealing member or gasket mounted on the spool is shifted, by spool movement, from a position on one side of the port or gap, across the port to the other side.

This type of valving has been referred to as "across-the-gap" valving, because the sealing member on the spool moves across the fixed gap or port in the body. An example of such valving is shown in U.S. Pat. No. 3,819,152, in which a flexible sealing member on a movable spool valves the flow of fluid through a port in the form of a narrow annular gap extending circumferentially around the spool chamber. The port is formed by a stack of three interfitting elements having complex shapes, including a pair of annular elements having opposed circular internal edges that form the respective edges of the port, and an annular locator which spaces the two port edge-forming elements apart and at the same time aligns them axially.

The foregoing illustrates limitations known to exist in present valve devices. Thus it is apparent that it would be advantageous to provide an alternative directed to overcoming one or more of the limitations set forth above. Accordingly, an alternative annular port construction for valve applications is provided including the features more fully disclosed hereinafter.

SUMMARY OF THE INVENTION

According to the present invention, a body element for a spool valve is provided that includes a body having an inner surface that defines an internal valving chamber having a longitudinal axis, and at least one transverse surface to the longitudinal axis. The transverse surface has at least one port comprising an annular flow passage, an intermediate flow passage and an outer flow passage extending outward from and in fluid communication with the inner surface of the internal valving chamber.

The foregoing and other aspects will become apparent from the following detailed description of the invention when considered in conjunction with accompanying drawing figures.

BRIEF DESCRIPTION OF THE DRAWING FIGURES

DETAILED DESCRIPTION OF THE PREFERRED EMBODIMENTS

Figure 1:
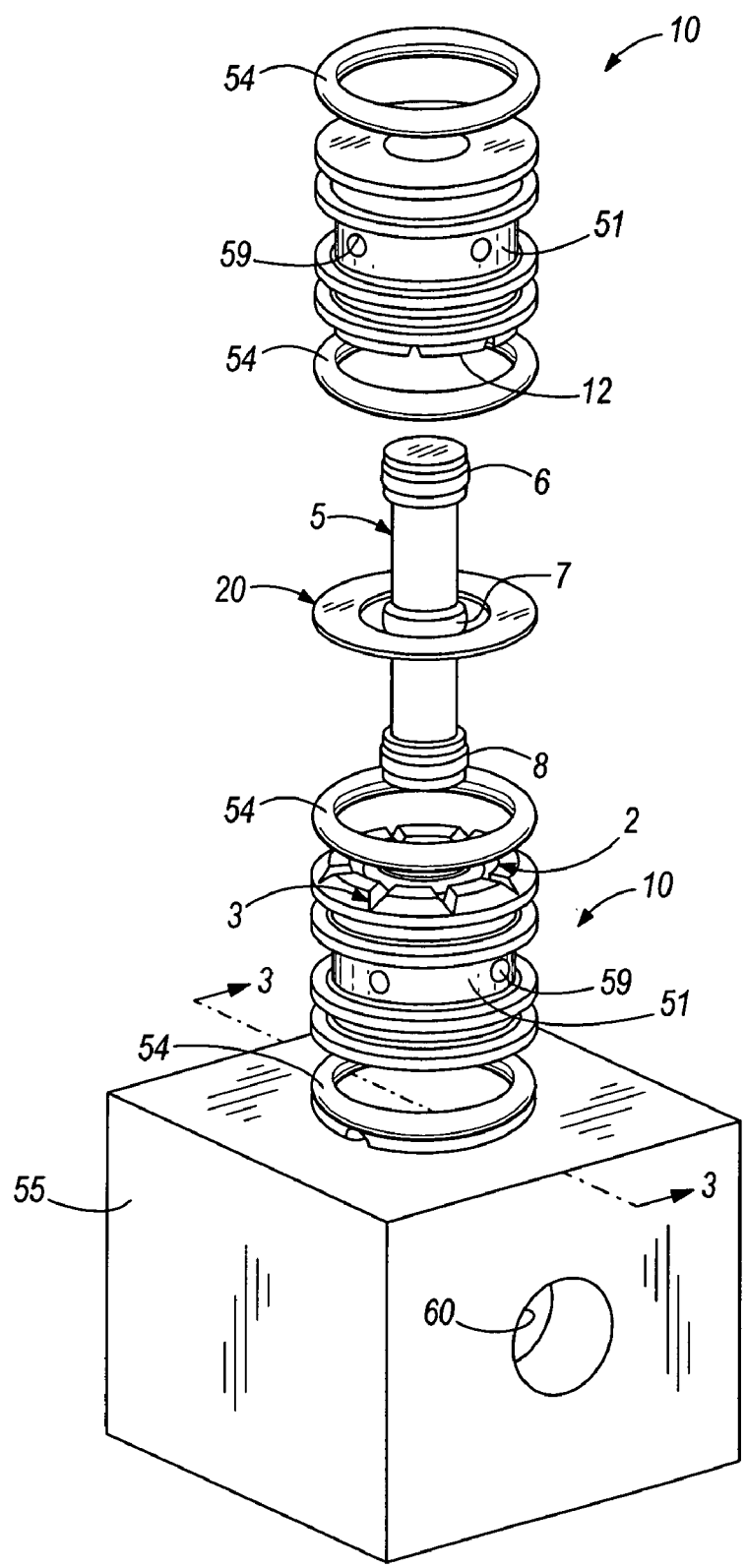
FIG. 1 is an exploded perspective view of a plunger and a manifold body with valve port-performing elements in accordance with an embodiment of the present invention shown.
Figure 2:
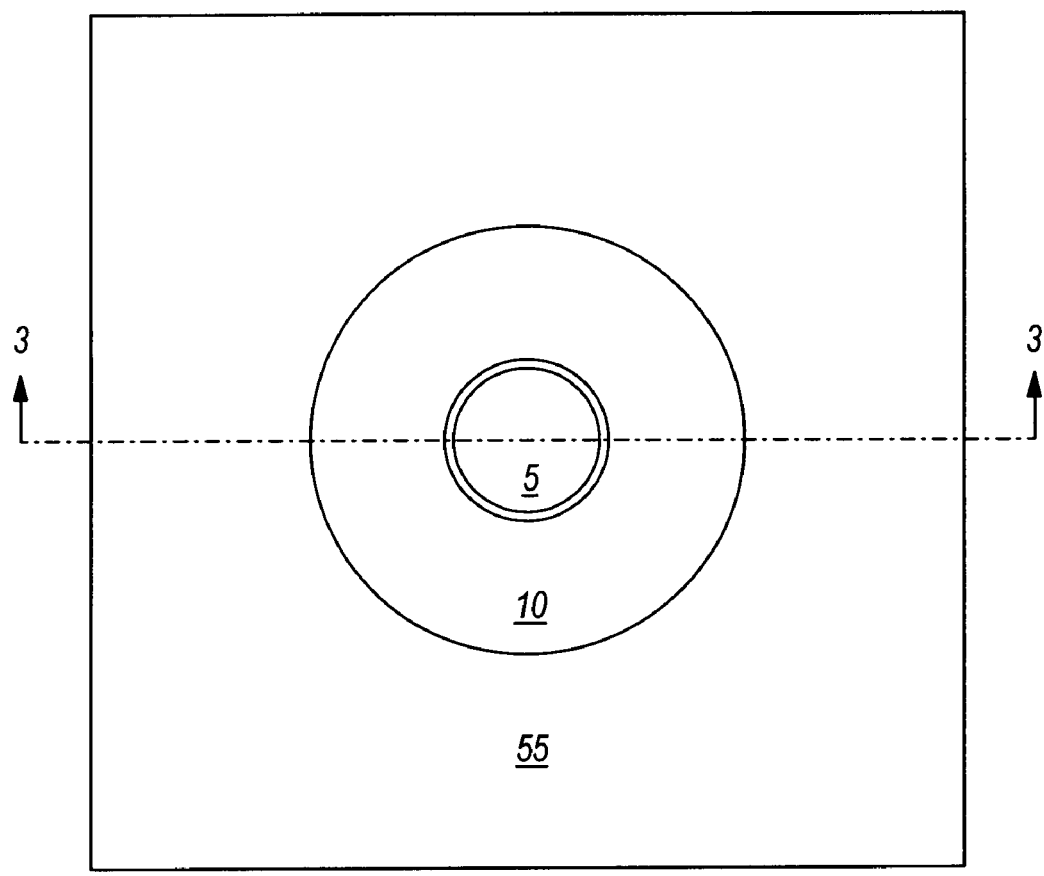
FIG. 2 is a top view of the valve port-performing elements and plunger assembled into the manifold body of FIG. 1.

The invention is best understood by reference to the accompanying drawings in which like reference numbers refer to like parts. It is emphasized that, according to common practice, the various dimensions of the component parts as shown in the drawings are not to scale and have been enlarged for clarity.

Figure 3:
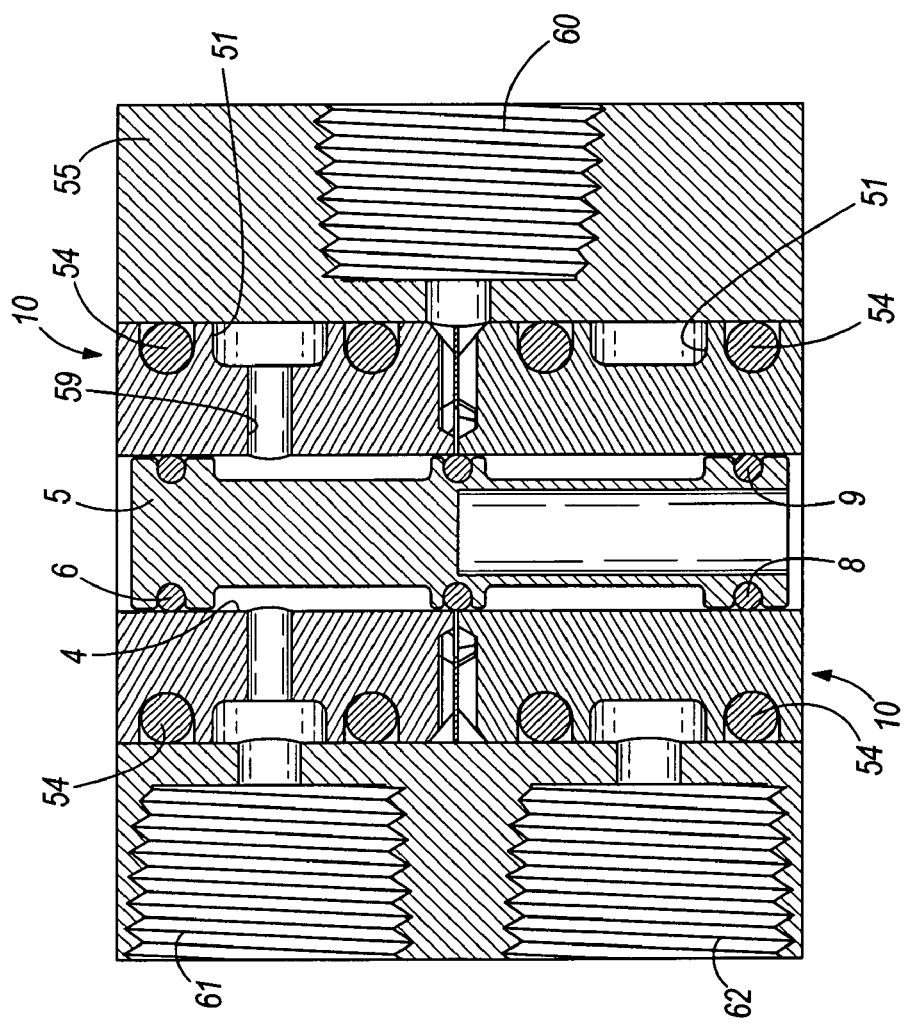
FIG. 3 is a sectional view taken along the line "3—3" in FIGS. 1 and 2.

The valve port-forming construction of this invention is suitable for use in many different types and configurations of spool valves. For purposes of explanation, and without intending to limit the environment or utility of the invention, the invention is illustrated in FIGS. 1–4 as a three-way pneumatic spool valve having a spool 5 disposed in an internal valving chamber 4 of a manifold body 55 having fluid inlet/outlet ports 60, 61, and 62 connected therewith. As shown in FIGS. 1 and 3, the three-way valve has an annular port which includes an inner annular flow passage 1, an intermediate annular groove 2, and an outer flow passage 3 which are formed in accordance with the invention and described in detail below.

FIG. 1 shows an exploded view of the components that form the annular port of the assembled three-way valve shown in FIG. 3 which include a spacer element 20 stacked between cylindrical body elements 10. Each body element 10 is annular and has a cylindrical inner surface each having the same diameter such that when elements 10 are coaxially stacked, their inner surface provide portions of the valve side wall which define internal valving chamber 4. As shown in FIG. 1, radially outwardly opening fluid channels 51 are formed around each body element 10, which are connected to the internal valving chamber 4 in body elements 10 by openings or passages 59 located in fluid channels 51. Additional channels located on both sides of each fluid channel 51 are provided in which O-rings 54 are retained. As described hereinafter in detail, body elements 10 are spaced apart by spacer element 20, which is a shim element in the form of a substantially flat ring.

Figure 4:
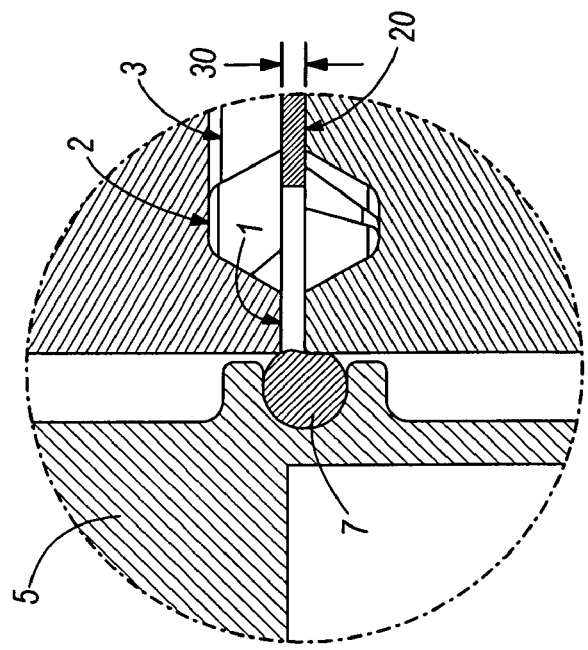
FIG. 4 is an enlarged partial sectional view showing the annular port bounded by the dashed line in FIG. 3.

Body elements 10 have transverse surfaces 12, into which intermediate annular grooves 2 are molded or machined such that when oriented to face one another, form an intermediate flow passage. Moving radially inward from and in fluid communication with the intermediate flow passage is an annular flow passage 1, which extends circumferentially around the cylindrical, inner side wall surface that defines internal valving chamber 4. Annular flow passage 1 is the annular gap 30 created between the transverse surfaces 12 when body elements 10 are maintained in a spaced apart relationship by spacer element 20 as shown in FIGS. 3 and 4. As will be observed from FIG. 4, the width of annular flow passage is defined by the thickness of spacer element 20 disposed between body elements 10. Although each of the inner edges of the transverse surfaces 12 adjacent the annular flow passage 1 are shown flat, they may be provided with a radius or chamfer to facilitate smooth movement of an O-ring 7 of spool 5 past it.

Moving radially outward from and in fluid communication with the intermediate flow chamber formed by intermediate annular grooves 2, are outer flow passages 3 that are molded or machined into the transverse surfaces 12 of body elements 10. Outer flow passages 3 may be in the form of slits or notches that are located at spaced intervals in the outer edges of transverse surfaces 12 to be stacked against spacer element 20. These slits or notches may be positioned radially outward from the longitudinal axis of body elements 10 or otherwise located such that fluid communication is established between the internal valving chamber 4 and the intermediate annular groove 2. In this manner, ports comprising the annular flow passage, the intermediate flow passage, and the outer flow passage sequentially establish fluid communication between internal valving chamber 4 and fluid inlet/outlet ports 60, 61, and 62.

The spool 5 that coacts with the respective ports to valve the flow of fluid is best shown in FIGS. 1 and 3 disposed and axially shiftable within internal valving chamber 4 to selectively valve the flow of fluid therethrough. A plurality of grooves are formed around its external surface which contain a series of flexible sealing members comprising O-rings 6, 7, and 8 that cooperate with and seal against the internal valving chamber 4 as shown. A recess 9 may also be included for inserting a spring to provide a spring-return construction. As shown in FIG. 3 and the detailed exploded view of FIG. 4, as spool 5 reciprocates, O-ring 7 cooperates with the annular flow passage 1 to provide "across-the-gap" valving by alternately shifting the spool sections between O-rings 6 and 7 and between O-rings 7 and 8 in and out of communication with annular flow passage 1.

Manifold body 55 holds the respective elements of the valve, including body elements 10 and spacer element 20, in stacked, assembled relation. Upon reciprocating movement of spool 5, inlet/outlet ports 61 and 62 provided in manifold body 55 selectively communicate with inner annular flow passage 1 via fluid channels 51 and internal valving chamber 4 as shown in FIG. 3, thereby selectively interconnecting the inlet/outlet ports 61 and 62 to inlet/outlet port 60 to alternately direct fluid flow therebetween.

Assembly of the valve according to the present invention is achieved by simply stacking the body elements 10 on opposite sides of spacer element 20 in manifold body 55. As described above, the spacer element 20 spaces the transverse surfaces 12 of the body elements 10 apart by a precise dimension while manifold body 55 aligns the body elements 10 concentrically so that they form a cylinder of uniform diameter.

The cylindrical body elements 10 according to the present invention may be made of conventional materials such as polymers such as nylon or metals such as stainless steel or brass and using conventional manufacturing techniques such as molding and machining to produce the final forms described above. In the case of polymer materials, injection molding may be used to substantially reduce or eliminate the need for any final machining. In the case of metallic materials, powder metallurgical molding methods may be used to simplify manufacture and substantially reduce or eliminate the need for any final machining.

The spacer elements 20 according to the present invention may be made of conventional materials such as polymers such as nylon or metals such as stainless steel or brass and using conventional manufacturing techniques such as molding and machining to produce the final forms described above. In the case of polymer materials, injection molding may be used to substantially reduce or eliminate the need for any final machining. In the case of metallic materials, powder metallurgical molding methods or die stamping of sheet stock material may be used to used to simplify manufacture and substantially reduce or eliminate the need for any final machining.

As described above and as shown, body element 10 is asymmetrical about a transverse plane through its axial midpoint, with one half having a port-forming transverse surface 12 from which an annular port is formed. It is contemplated that the invention can be used in valves having a larger number of annular ports than the single annular port shown. It is to be understood that a multiport valve having any number of additional annular ports may be accomplished by incorporating additional cylindrical elements having port-forming edges provided on both halves of each element and stacking the requisite number of such elements between cylindrical body elements 10, until the desired number of ports is obtained.

It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A spool valve comprising:
   a spacer element disposed between at least two body elements, the body elements each having
   a body having an inner surface that defines an internal valving chamber having a longitudinal axis; and
   at least one transverse surface to the longitudinal axis, the transverse surface having at least one port comprising an annular flow passage, an intermediate flow passage and an outer flow passage extending outward from and in fluid communication with the inner surface of the internal valving chamber;
   wherein the at least one port are one of slits and notches positioned radially outward from the longitudinal axis of the body element.

2. The spool valve according to claim 1 wherein the annular flow passage is an annular gap created between opposed transverse surfaces of the body elements maintained in a spaced apart relationship by the spacer element.

3. The spool valve according to claim 1 wherein the intermediate flow passage is formed by an annular groove located in the at least one transverse surface.

4. The spool valve according to claim 1 wherein the outer flow passage is located in an outer edge of the transverse surface.

5. The spool valve according to claim 1 wherein the at least one port is multiple ports having outer flow passages at spaced intervals in the outer edge of the transverse surface.

6. The spool valve according to claim 1 further comprising a manifold body that maintains the at least two body elements in a stacked relation.

7. The spool valve according to claim 6 further comprising a spool disposed in the inner surface of the at least two stacked body elements for reciprocating movement along the longitudinal axis therein, and
   a plurality of inlet/outlet ports provided in the manifold body such that upon reciprocating movement of the spool, the inlet/outlet ports are selectively interconnected.

8. The spool valve according to claim 1 wherein the cylindrical elements comprise at least one of a polymer and a metallic material.

9. The spool valve according to claim 1 wherein the spacer element is a substantially flat ring.

10. The spool valve according to claim 1 wherein the spacer element comprises at least one of a polymer and a metallic material.

* * * * *